June 7, 1966 R. H. WISE 3,254,358
WINDSHIELD WIPER CONNECTOR
Filed Nov. 12, 1963 3 Sheets-Sheet 1
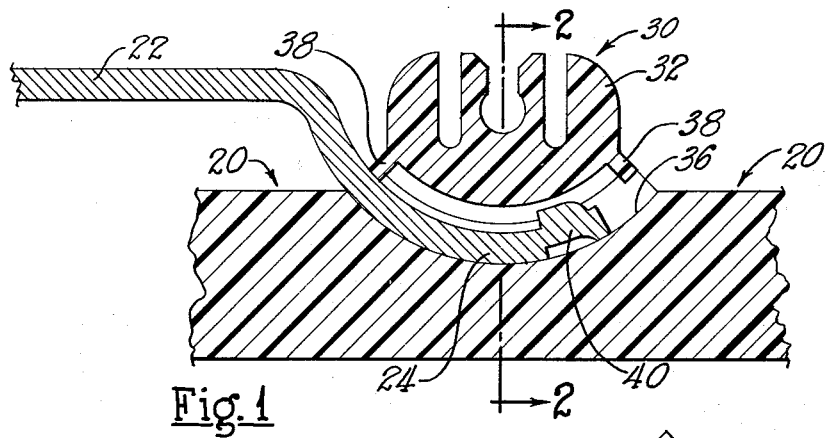
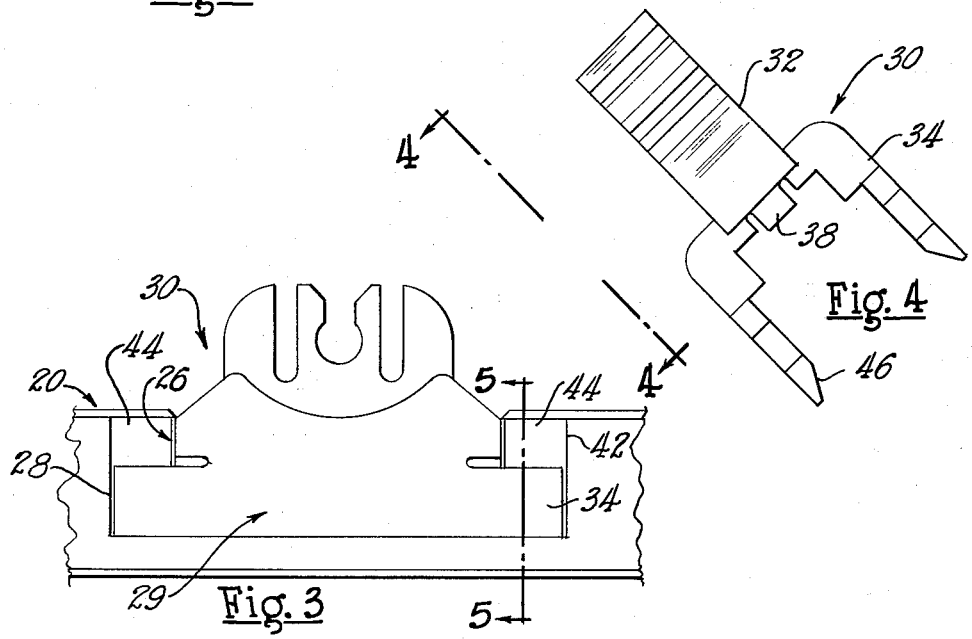
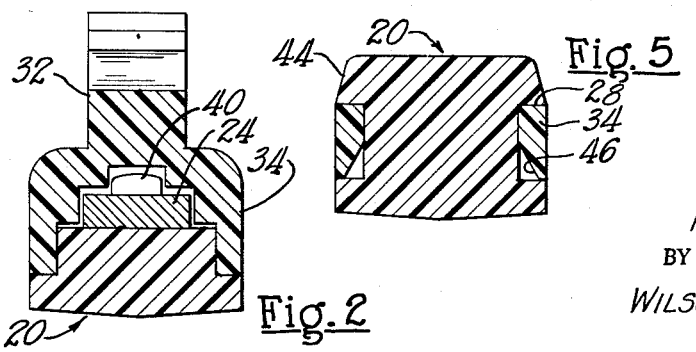
INVENTOR.
RALPH H. WISE
BY
WILSON, SETTLE & CRAIG
ATTORNEYS June 7, 1966  R. H. WISE  3,254,358
WINDSHIELD WIPER CONNECTOR
Filed Nov. 12, 1963  3 Sheets-Sheet 2
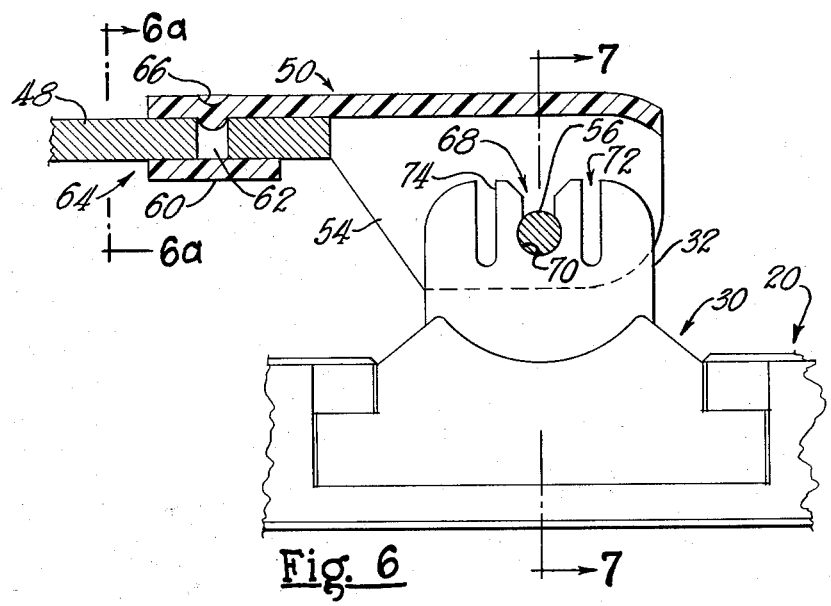
Fig. 6
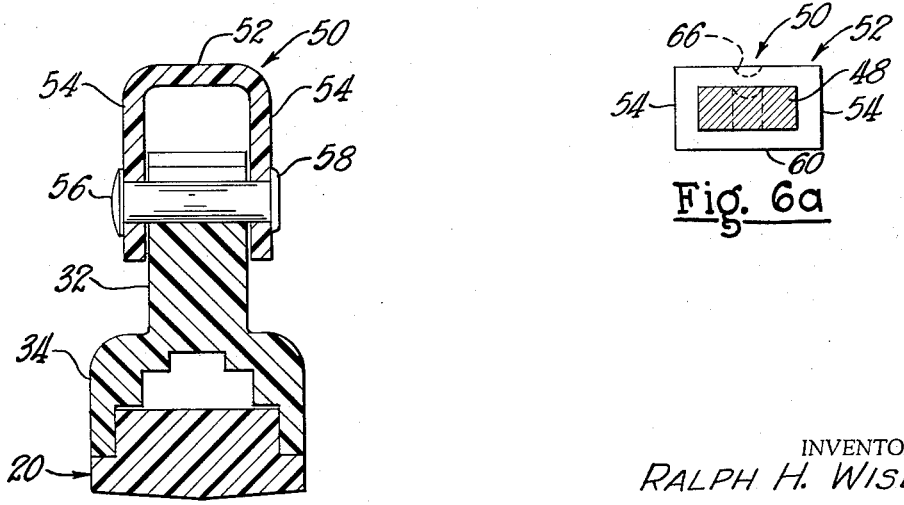
Fig. 7
Fig. 6a
INVENTOR.
RALPH H. WISE
BY
WILSON, SETTLE & CRAIG
ATTORNEYS June 7, 1966 R. H. WISE 3,254,358
WINDSHIELD WIPER CONNECTOR
Filed Nov. 12, 1963 3 Sheets-Sheet 3
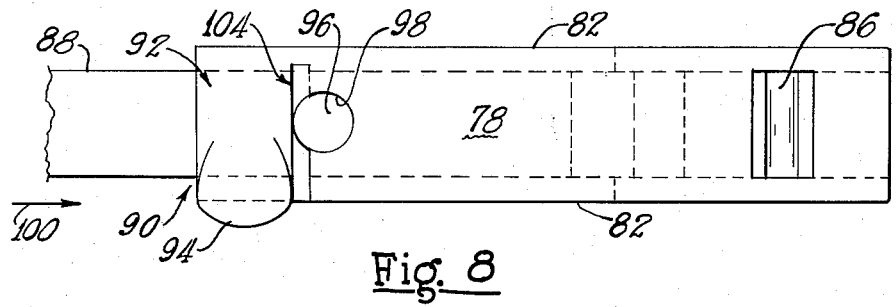
Fig. 8
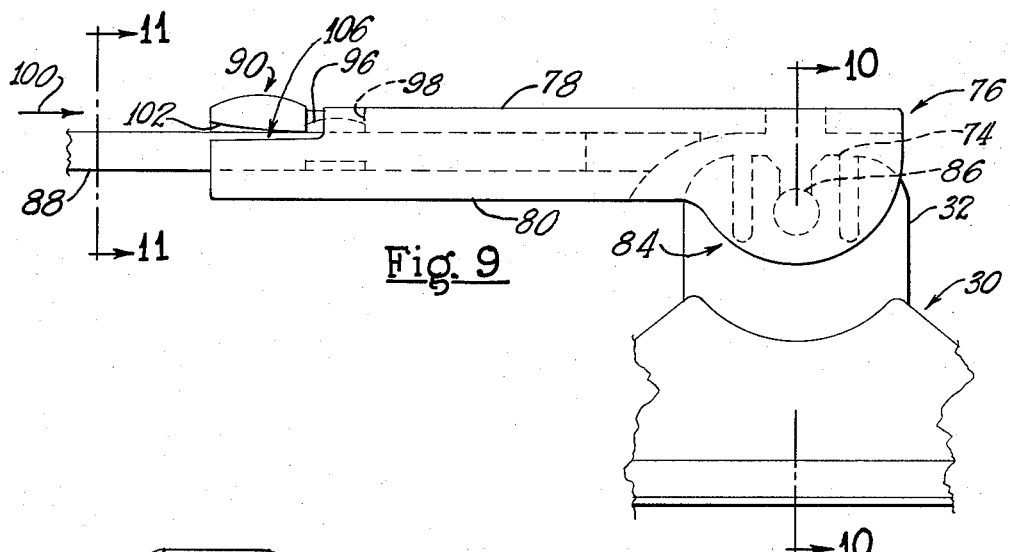
Fig. 9
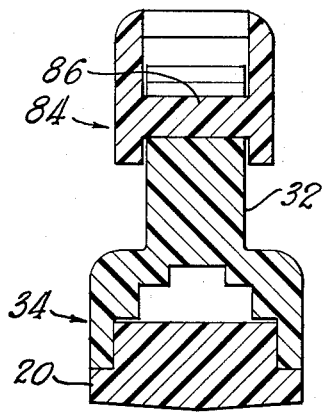
Fig. 10
Fig. 11
INVENTOR.
RALPH H. WISE
BY
WILSON, SETTLE & CRAIG
ATTORNEYS

# United States Patent Office 3,254,358
Patented June 7, 1966

3,254,358
WINDSHIELD WIPER CONNECTOR
Ralph H. Wise, 26235 W. Warren Ave., Dearborn, Mich.
Filed Nov. 12, 1963, Ser. No. 322,982
4 Claims. (Cl. 15—250.32)

This invention relates to windshield wiper constructions, and more particularly to novel connectors whereby various windshield wiper actuating arms can be operatively attached to various wiper assemblies, whether the arm has a spoon or stub end, and further characterized by a pin connection where a stub end arm is involved.

The problem

Windshield wiper constructions, customarily comprise the following elements:

(a) An actuating motor having an exposed shaft;
(b) An actuating arm operatively connected to the shaft; and
(c) A wiper assembly operatively connected to the free end of the actuating arm.

Windshield wipers of the prior art seem to have been made unnecessarily complicated; thus, requiring a different connector dependent on whether the actuating arm has a spoon end or a stub end.

Defects or deficiencies of these prior art developments are well known to substantially everyone and more particularly to the motorist whose automobile is fitted with these devices. Thus, when it comes time to replace worn out or deteriorated blades, he can seldom do that job or task easily. There is no simple connection between wiper and arm.

First, blades as such are seldom stocked because the connection between the blade and the bow is so complicated that the entire unit is usually replaced.

Further, it is not easy to replace the wiper assembly at just any cross-roads shop. The connection between arm and wiper assembly must be just so, that is just the right wiper assembly with just the right connector between bow and actuating arm must be used. This means that a considerable search is often required to find just the right wiper assembly with just the right connector for the particular arm end on the particular car.

Accordingly, a substantial advance to the art would be provided by a novel universal connector between windshield wiper actuating arm and wiper bow; of simplified construction; of improved efficiency; and substantially lower manufacturing cost.

It is therefore an important object of the present invention to provide a novel universal windshield wiper connector.

A further object is to provide a novel windshield wiper connector of improved versatility and for use with actuating arms having either spoon or stub ends.

A further object is to provide a novel windshield wiper connection of improved economy of manufacture from synthetic resin and further characterized by novel use of inherent flex characteristics of the material of construction.

Other objects of this invention will appear in the following description and appended claims, reference being had to the accompanying drawings forming a part of this specification wherein like reference characters designate corresponding parts in the several views.

FIGURE 1 is an enlarged, fragmentary, axial sectional view taken through the connector mechanism of the invention, as carried by the bow of a wiper assembly;

FIGURE 2 is a sectional view taken along line 2—2 of FIGURE 1;

FIGURE 3 is an enlarged, fragmentary, side elevational view showing the connector of invention as carried by the bow of a wiper assembly;

FIGURE 4 is an elevational view taken along line 4—4 of FIGURE 3;

FIGURE 5 is a sectional view taken along line 5—5 of FIGURE 3;

FIGURE 6 is an enlarged, fragmentary, side elevational view similar to FIGURE 3, but with a pin-type actuating arm connection, including an adapter between the connector and a stub end arm, the adapter being shown in section;

FIGURE 6a is a sectional view taken along line 6a—6a of FIGURE 6;

FIGURE 7 is a sectional view taken along line 7—7 of FIGURE 6;

FIGURE 8 is an enlarged top plan view, showing a second pin-type adapter;

FIGURE 9 is a side elevational view of FIGURE 8;

FIGURE 10 is a sectional view taken along line 10—10 of FIGURE 9; and

FIGURE 11 is a sectional view taken along line 11—11 of FIGURE 9.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The environment

The environment for the present invention is so well known and common place as almost to be taken for granted by many people. These include literally millions of automobile owners and operators, as well as owners and operators of other vehicles using these devices. The device at issue is the windshield wiper that moves to-and-fro across the windshield of the vehicle as during a rainstorm.

As brought out in my copending application, Serial No. 322,981, filed November 20, 1963 (file 4764), now Patent No. 3,178,753, issued April 20, 1965, the various parts involved in performing this apparently simple task include the following:

(a) A windshield wiper motor carried beneath the cowling of the vehicle; and having
(b) A power shaft extending out through the cowling and presenting an exposed end;
(c) An actuating arm is connected to the exposed end of the pivot shaft by means of an arm socket attached to the said exposed end. The arm socket carries the actuating arm through a pivot connection and includes a concealed spring that provides a force by which the wiper blade is biased against the windshield of the vehicle. The actuating arm may have either a spoon or stub end. This provides complications as set out above.
(d) The wiper assembly proper comprises bow and blade subassemblies operatively connected with one another and presenting a wiping edge in contact with the exposed windshield surface.

The connector of invention

Between the actuating arm and wiper assembly as set out above, there is the all important connector of invention. This is now set out below in detail, and as the description progresses, it will become apparent that not only a hook end connection but two stub end adapters are also encompassed within the scope of invention.

Thus, as shown in FIGURE 1, the bow 20 of a wiper assembly is the part which by the present invention is operatively connected to the end of an actuating arm 22. The actuating arm here shown has a spoon end 24.

FIGURES 3 and 5 show that the material making up the body of the bow 20 is removed at the center to provide opposed, mortise-type slots 26, with reentrant notches 28 along the bottom portions of the sides 29. This provides a stepped structure so that when the connector 30, of saddle shape as shown in FIGURE 4, is pressed over the remaining material of the bow 20, it will automatically "snap home."

Referring to FIGURE 4, note that the saddle shaped connector 30 has a central body 32 with outboard and depending spaced legs 34 that embrace the central notched portion of bow 20. This is also shown in FIGURES 2 and 5.

FIGURE 1 shows that the material of bow 20 is removed along the top edge as a concave cavity 36, providing room between body 32 and the upper surface of cavity 36 to receive spoon end 24 of actuating arm 22.

By reference to FIGURE 1, note the tab elements 38, also shown in FIGURE 4, which define an arcuate track within which the spoon end 24 is cradled. This provides relative pivotal movement between the end 24 of arm 22 and bow 20.

Note that an upset tab 40 is provided adjacent the terminus of spoon end 24. It will be observed that this can be "forced by" the inside tab 38 and the tab will then spring back to its original position, locking the spoon end 24 to connector 30. Removal is effected in reverse. The manner in which the end 24 is cradled between the top of concave cavity 36 and body 32 is also illustrated in FIGURE 2. Note the end view of the upset tab 40 in that figure.

Referring to FIGURES 3, 4 and 5, note the subtleties involved. The line 42 of FIGURE 3 represents an end juncture of a slanted surface 44. Note in FIGURES 4 and 5, the tapers 46 at the bottom ends of legs 34. Departure lines 42 serve as end placement guides and tapers 46 embrace slanted surfaces 44 to enable the connector 30 to be shoved home accurately. The manner in which the ends of legs 34 snap in place is shown in FIGURE 5.

It should be pointed out that the connector 30 is made of resilient material, preferably Delrin resin, a trademark of Du Pont Company.

*The two-fold nature of connector 30*

Now refer to FIGURES 6, 6a and 7 for the manner in which a pin end adapter on a stub end wiper actuating arm can be used to provide an operable connection to a windshield wiper assembly.

Due to the fact that the actuating arm here shown has a stub or butt end rather than a hook end of the nature of 24 in FIGURE 1, it is designated by a new reference numeral 48. The pin end adapter is designated 50. As shown in FIGURE 7, adapter 50 is of generally U-shaped section and comprises a bight portion 52 joining spaced depending arms 54. As shown in FIGURE 6, arms 54 are of generally trapezoidal, plate-like configuration; and a headed pin 56 is passed transversely through these arms as shown in FIGURE 7 and peened over at 58. This provides an assembled relationship of parts. If pin 56 be of heat-softenable resin, the peen 58 can be effected by a hot iron.

As shown in FIGURE 6, the back end of adapter 50 is of box section with arms 54 rolled under to form a bottom transverse wall 60.

Adjacent the end of actuating arm 48 there is provided an aperture 62 with the box end 64 in place, a dimple at 66 locks the two arm components together. FIGURE 6a shows the dimple 66 at a central location on bight portion 52.

Note now the configuration of the upper portion of the body 32 of connector 30 to receive the pin 56 and provide an operable connection between actuating arm 48 and the bow 20 wiper assembly. A central notch 68 extends transversely of body 32 and bottoms as a part cylindrical pivot socket 70. Relief notches 72 are formed on either side of central notch 68 to permit the arms 74 so formed to flex and receive pin 56 when pressed into central notch 68.

*A second pin end connector adapter*

Prior to discussing the embodiment shown in FIGURES 8 through 11, it should be reiterated that the embodiment shown in FIGURES 6 and 7 is also fabricated of injection molded synthetic resin, more particularly Delrin, a trademark of the Du Pont Company. The advantages of manufacturing the connector of this material on a mass production basis will be clearly evident to those skilled in the art. It has flex and working characteristics ideally suited to this application. Further, multiple cavity injection molding will greatly reduce costs of manufacture.

Referring now to FIGURES 8 through 11, it will be noted that the connecter 30 as attached to the bow of a wiper assembly is the same as that previously described. This provides a similar environmental background therefore for the second pin connector adapter.

To continue, however, it will be noted that the body of the adapter, designated 76, is of elongated tubular construction, more specifically box tubular construction. It thus includes an upper wall 78, a lower wall 80, and opposed side walls 82. At the right hand end, the side walls 82 flare downwardly as at 84 to provide a pin support apron with a pin 86 integrally injection molded therebetween.

Attention is directed to the unique manner in which the actuating arm 88 is snap-coupled to adapter 76. Note the left side of FIGURES 8 and 9 for further description of this method of attachment. The adapter 76 is made of a resilient synthetic resin that is inherently flexible or resilient to a controlled degree; thus advantage has been taken of this characteristic for the attachment now to be described. Note the spring tab element 90 that has been formed on the inner end of adapter 76. In the plan view of FIGURE 8, this will be noted to be of generally rectangular shape and extends from its captive end 92 to the free catch end 94. The resiliency of the synthetic resin permits catch end 94 to flex upwardly and then drop down behind the catch button 96 formed on the top side of the actuating arm 88.

Looking at FIGURE 8, note that a generally circular recess 98 is formed in top wall 78 to cradle and embrace the button 96 when the actuating arm 88 is shoved into the interior of the body of the adapter 76 in the arrow direction 100. To make entry of the actuating arm 88 and button 96 easier, note the tapered wall 102, providing a gentle cam action as the button 96 enters.

Also referring to FIGURE 8, note the relief notch 104 that permits the spring tab element 90 to hinge. Also, referring to FIGURE 9, note the relief notch 106 that also permits the spring tab element 90 to hinge upwardly.

The pin 86 is received between arms 74 in the same manner as previously described for FIGURES 6 and 7, for attaching the assembly: adapter 76—connector 30, to the bow of a wiper assembly.

The section view of FIGURE 11 shows more clearly the tapered cam wall 102 permitting easy entry of the catch button 96.

Delrin is the synthetic resin specifically referred to above. However, other materials having analogous flex and working characteristics are to be included within the scope of invention. In some instances, various ones of the nylons may be desirable.

Delrin is the Du Pont Company's registered trademark for thermoplastic resin ($-(-OCH_3-)_n$).

The present invention is to be understood as including a connector wherein the notch 68 has a relief notch on only one side and thus forming only a single flex arm 74.

In some instances, the relief notches 72 can be omitted, as where the material of the connector is sufficiently resilient to let the notch 68 flex apart enough to receive a pin end.

While certain embodiments of this invention have been described, it will be apparent to those skilled in the art that the disclosed embodiments may be modified. Therefore, the foregoing description is to be considered exemplary rather than limiting, and the true scope of the invention is that defined in the following claims.

I claim:
1. In a connector,
   a body forming a bight portion and having spaced legs extending away from one side,
   said body at said bight portion having an arcuate surface with tabs adjacent the terminal ends thereof, and
   opposite said arcuate surface, a notch with means on at least one side of said notch forming a flexible arm.
2. In a connector,
   a body forming a bight portion and having spaced legs extending away from one side,
   said bight portion defining a convex arcuate surface with tabs at each end and extending away from said body, and
   opposite said surface on the other side of said body, means defining a notch having sides adapted to flex apart and receive a pin end carried by a windshield wiper actuating arm.
3. The invention of claim 1 as made of a resilient synthetic resin.
4. The invention of claim 2 as made of a resilient synthetic resin.

References Cited by the Examiner

UNITED STATES PATENTS

| | | | |
|---|---|---|---|
| 2,709,825 | 6/1955 | Nesson | 15—250.32 |
| 2,916,760 | 12/1959 | Anderson | 15—250.33 |
| 2,965,914 | 12/1960 | Anderson | 15—250.32 |
| 3,023,446 | 3/1962 | Prohaska | 15—250.32 |

FOREIGN PATENTS 228,998   7/1960   Australia.

CHARLES A. WILLMUTH, *Primary Examiner.*